United States Patent [19]

Wu

[11] Patent Number: 5,149,149

[45] Date of Patent: Sep. 22, 1992

[54] PIPE CONNECTING DEVICE WITH BAYONET AND INTERLOCKING BUSHING STRUCTURE

[76] Inventor: Wen C. Wu, 132-2, Hsi Hsin Street, Chang Ya Village, Hsiu Shui Hsiang, Changhua, Taiwan

[21] Appl. No.: 821,039

[22] Filed: Jan. 16, 1992

[51] Int. Cl.[5] .............................................. F16L 37/00
[52] U.S. Cl. .................................... 285/402; 285/401; 285/396; 285/397; 403/292; 403/348
[58] Field of Search .............. 285/401, 402, 360, 361, 285/396, 376, 370, 397; 403/349, 348, 292

[56] References Cited

U.S. PATENT DOCUMENTS

| | | | |
|---|---|---|---|
| 745,679 | 12/1903 | Schulze | 403/292 X |
| 904,603 | 11/1908 | Crocker | 285/396 X |
| 2,913,260 | 11/1959 | Givens | 285/402 X |
| 3,470,524 | 9/1969 | Culver | 285/361 X |
| 4,361,353 | 11/1982 | Vinson | 403/348 X |

FOREIGN PATENT DOCUMENTS 1104273  4/1961  Fed. Rep. of Germany ...... 285/361
89440  11/1958  Netherlands ..................... 285/402

Primary Examiner—Randolph A. Reese
Assistant Examiner—Timothy Aberle
Attorney, Agent, or Firm—Bacon & Thomas

[57] ABSTRACT

A pipe connecting device for detachably connecting two tubes into a support to be used in a floor lamp, the pipe connecting device comprising two bushes respectively fastened in two tubes at the connecting ends thereof in a flush manner, the bushes each having a curved locating groove extending from a longitudinal guide groove thereof, and a pipe connector for connecting the two bushes together, said pipe connector having a circular outward flange at the middle and two unitary pins projecting from an outer wall surface thereof at right angles, wherein the two tubes can be detached from each other when the guide groove on either bush is aligned with each other, or firmly connected together when said two unitary pins are respectively engaged into the locating grooves on the two bushes.

2 Claims, 2 Drawing Sheets

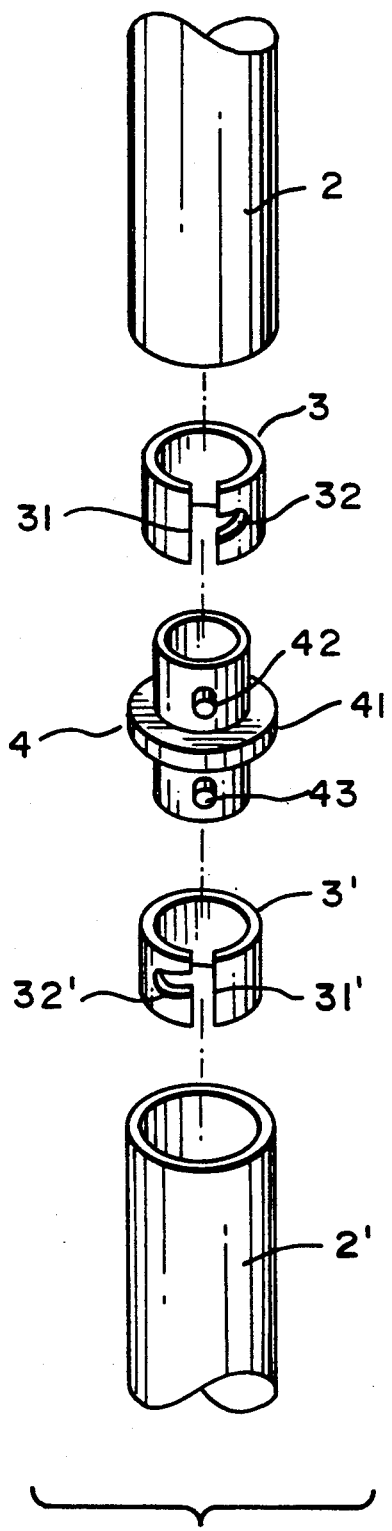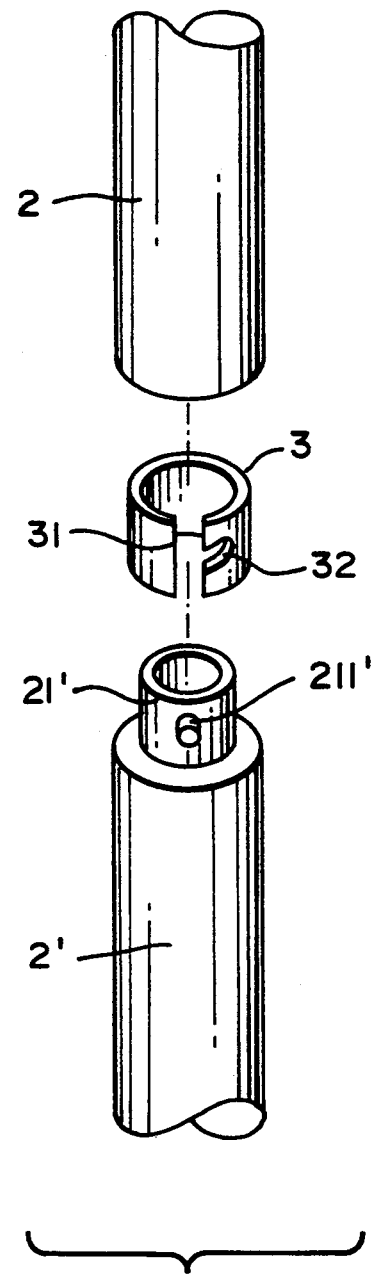
FIG.1
FIG. 2

5,149,149

PIPE CONNECTING DEVICE WITH BAYONET AND INTERLOCKING BUSHING STRUCTURE

BACKGROUND OF THE INVENTION

1. Field of the Invention

The present invention relates to pipe connecting devices and relates more particularly to a pipe connecting device used in connecting tubes into a supporting rod for supporting a lamp holder on a stand.

2. Description of Prior Art

A floor lamp generally includes an elongated support used in supporting a lamp holder on a stand or base. This elongated support is generally consisted of several tube sections that can be conveniently detached from each other so as to reduce the space occupation of a floor lamp during its delivery or packing. Several methods have been known and used in connecting each two adjacent tube sections into a line. For example, two tube sections may be connected into a line by means of a screw joint, i.e., one tube section has an outer thread at one end screwed into an inner thread on the other tube section at either end thereof. In another known method, two tube sections may be connected into a line by engaging a spring retainer on one tube section into a retaining hole on the other tube section. However, the aforesaid methods are still not satisfactory in use. Unsteady problem tends to happen when two tube sections are connected by means of engaging a spring retainer into a retaining hole. This unsteady problem will become more apparent when several tube sections are connected together. If two tube sections are connected together through a screw joint, the threads of the tube sections may be damaged easily causing connection failure. Further, before connecting several tube sections into a support during the assembly of a floor lamp, electric wires should be firstly inserted through the tube sections and connected to a lamp holder. When the tube sections are connected together through screw joints, the electric wires may be twisted and damaged causing electric leakage problem.

SUMMARY OF THE INVENTION

The present invention has been accomplished to eliminate the aforesaid disadvantages and problems. It is therefore an object of the present invention to provide a pipe connecting device used in the assembly of a floor lamp which permits two tubes to be conveniently firmly connected together in a line.

According to a first embodiment of the present invention, a pipe connecting device is generally comprised of a first bush fixedly fastened in a first tube in flush with an end edge thereof, a second bush fixedly fastened in a second tube in flush with an end edge thereof, and a pipe connector to connect said first and second bushes together. The first and second bushes each comprises a guide groove through the periphery thereof in a longitudinal direction and a curved locating groove extending from said guide groove and through the periphery thereof in a latitudinal direction. The locating groove on the first bush curves leftwards and upwards, while the locating groove on the second bush curves rightwards and downwards. The pipe connector has a circular outward flange at the middle and two opposite unitary pins projecting from an outer wall surface thereof at right angles. The two tubes can be detached from each other when the guide groove on the first bush is longitudinally aligned with the guide groove on the second bush. The two tubes are firmly connected together when the two unitary pins are respectively engaged into the locating grooves on the first and second bushes.

According to a second embodiment of the present invention, a pipe connecting device comprises a bush having a curved locating groove extending from a longitudinal guide groove thereof at right angle and being fixedly fastened in one tube at one end, and a pipe connector fixedly secured to the other tube at one end and having a pin projecting from an outer wall surface thereof at right angle. The pipe connector can be inverted into the bush by engaging the pin into the guide groove. The two tubes are firmly retained together when they are rotated on each other in two reverse directions permitting the pin to engage into the locating groove.

BRIEF DESCRIPTION OF THE DRAWINGS

The foregoing and other objects, features and advantages of the present invention will be best understood from the following description, the appended claims and the accompanying drawings in which:

FIG. 1 is an exploded perspective view of a pipe connector assembly embodying the present invention;

FIG. 2 is an exploded perspective view of an alternate form of the present invention;

DETAILED DESCRIPTION OF THE PREFERRED EMBODIMENT

Figure 4:
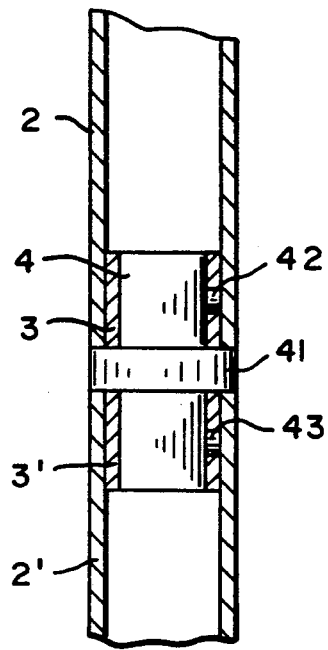
FIG. 4 is a side sectional view of the embodiment of FIG. 1.

Referring to FIG. 1, a pipe connector assembly is generally comprised of two bushes 3, 3' and a connector 4 for connecting two tubes 2, 2' into a line connected in a line. The two bushes 3, 3' are respectively fastened in the two tubes 2, 2' in flush with the connecting ends thereof by means of the process of high frequency welding. The two bushes 3, 3' each has a guide groove 31 or 31' through the periphery thereof in a longitudinal direction and a curved locating groove 32 or 32' extending from the guide groove 31 or 3" and through the periphery thereof in a latitudinal direction, wherein the locating groove 32 on one bush 3 curves leftwards upwards, the locating groove 32' on the other bush 3' curves rightwards upwards. The pipe connector 4 is made in a hollow structure having a circular flange 41 and two unitary pins 42, 43 respectively projecting from the outer wall surface thereof. The outer diameter of the pipe connector 4 is approximately equal to the inner diameter of the tubes 2, 2' while the outer diameter of the circular flange 41 is approximately equal to the outer diameter of the tubes 2, 2'.

Figure 3:
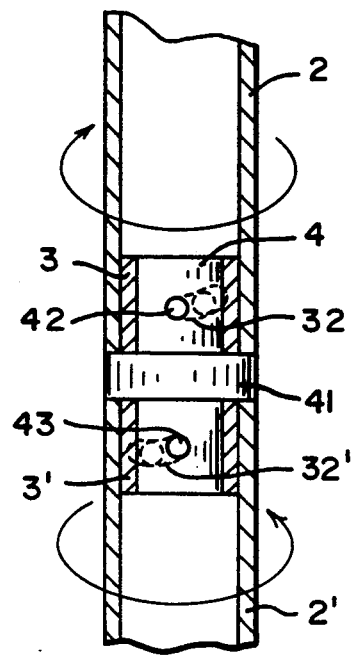
FIG. 3 is a front sectional view of the embodiment of FIG. 1.
Figure 5:
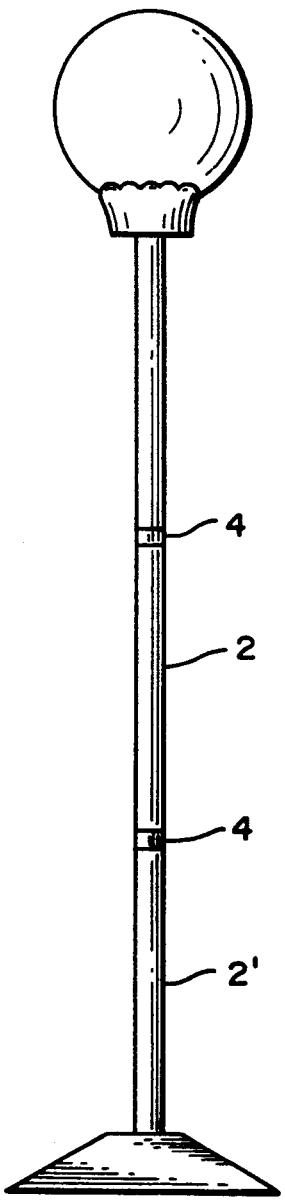
FIG. 5 illustrates a floor lamp as constructed according to the present invention.

Referring to FIGS. 3 and 4, the pipe connector 4 is connected between the two bushes 3, 3' which are fixedly respectively fastened in the two tubes 2, 2', permitting the pins 42, 43 to respectively inserted into the guide grooves 31, 31'. Under this status, the guide grooves 31, 31' are longitudinally aligned. Then, rotate the two tubes 2, 2' on the pipe connector 4 in two reverse directions causing the pins 42, 43 to engage into the locating grooves 32, 32' respectively. Thus, the two tubes 2, 2' become firmly retained in a line. By means of the aforesaid arrangement, a plurality of tubes can be connected into a supporting rod for supporting a lamp holder to a stand (see FIG. 5).

Referring to FIG. 2, therein illustrated is an alternate form of the present invention. In this embodiment, one tube 2' has a unitary pipe connector 21' at one end, which pipe connector 21' has a pin 211' projecting from the outer wall surface thereof. A bush 3 which of the same structure as indicated in the aforesaid first embodiment of the present invention and has a guide groove 31 and a locating groove 32 is fixedly fastened in the other tube 2 at one end in a flush matter. The two tubes 2, 2' can be conveniently firmly connected into a supporting rod by inserting the pipe connector 21' of the tube 2' into the bush 3 in the other tube 2 and then, rotating the tubes 2, 2' against each other permitting the pin 211' to engage into the locating groove 32.

I claim:

1. A pipe connecting device for connecting two tubes into a line, the connecting device includes a first bush fixedly fastened in one tube in flush with an end edge thereof, a second bush fixedly fastened in the other tube in flush with an end edge thereof, and a pipe connector to connect said first bush to said second bush, said first and second bushes each comprising a guide groove through the periphery thereof in a longitudinal direction and a curved locating groove extending from said guide groove and through the periphery thereof in a latitudinal direction, the locating groove of said first bush curving leftwards and upwards, the locating groove of said second bush curving rightwards and downwards, said pipe connector being made in a hollow structure having a circular outward flange at the middle and two unitary pins projecting from an outer wall surface thereof at right angles, said two unitary pins being arranged in a row and disposed at two opposite locations relative to said flange, wherein said two tubes can be detached from each other when the guide groove on said first bush is longitudinally aligned with the guide groove on said second bush; said two tubes are firmly connected together when said two unitary pins are respectively engaged into the locating grooves on said first and second bushes.

2. The pipe connecting device of claim 1 which comprises a bushing having a curved locating groove extending from a longitudinal guide groove thereof at right angle and being fixedly fastened in one tube at one end, and a pipe connector fixedly secured to the other tube at one end and having a pin projecting from an outer wall surface thereof at right angle, wherein said pipe connector can be inverted into said bushing by engaging said pin into said guide groove; said pin can be engaged into said locating groove by rotating said two tubes against each other permitting said two tubes to be firmly connected into a line.

* * * * *